United States Patent
Kim et al.

(10) Patent No.: US 11,568,731 B2
(45) Date of Patent: Jan. 31, 2023

(54) SYSTEMS AND METHODS FOR IDENTIFYING AN ACOUSTIC SOURCE BASED ON OBSERVED SOUND

(71) Applicant: Apple Inc., Cupertino, CA (US)

(72) Inventors: Hyung-Suk Kim, San Jose, CA (US); Daniel C. Klingler, Mountain View, CA (US); Miquel Espi Marques, Cupertino, CA (US); Carlos M. Avendano, Campbell, CA (US)

(73) Assignee: APPLE INC., Cupertino, CA (US)

( * ) Notice: Subject to any disclaimer, the term of this patent is extended or adjusted under 35 U.S.C. 154(b) by 47 days.

(21) Appl. No.: 16/872,168

(22) Filed: May 11, 2020

(65) Prior Publication Data

US 2021/0020018 A1 Jan. 21, 2021

Related U.S. Application Data

(60) Provisional application No. 62/874,389, filed on Jul. 15, 2019.

(51) Int. Cl.
*H04R 29/00* (2006.01)
*G08B 21/18* (2006.01)
*G01H 3/00* (2006.01)
*G08B 7/06* (2006.01)
(Continued)

(52) U.S. Cl.
CPC .......... *G08B 21/182* (2013.01); *G01H 3/005* (2013.01); *G06N 20/00* (2019.01); *G08B 7/06* (2013.01); *G10L 25/51* (2013.01)

(58) Field of Classification Search
CPC ...................................................... H04R 29/00
See application file for complete search history.

(56) References Cited

U.S. PATENT DOCUMENTS 9,837,068 B2 * 12/2017 Moon ..................... G10L 15/08
9,899,035 B2 * 2/2018 Kakadiaris .............. G06F 3/165
9,945,755 B2 * 4/2018 Pluemer ................. G01M 7/00
(Continued)

OTHER PUBLICATIONS

Ntalampiras, et al., On Acoustic Surveillance of Hazardous Situations, 2009, pp. 165-168, https://www.researchgate.net/publication/220735145_On_acoustic_surveillance_of_hazardous_situations.
(Continued)

*Primary Examiner* — Olisa Anwah
(74) *Attorney, Agent, or Firm* — BakerHostetler

(57) ABSTRACT

An electronic device includes a processor, and a memory containing instructions that, when executed by the processor, cause the electronic device to learn a sound emitted by a legacy device and to issue an output when the electronic device subsequently hears the sound. For example, the electronic device can receive a training input and extract a compact representation of a sound in the training input, which the device stores. The device can receive an audio signal corresponding to an observed acoustic scene and extract a representation of the observed acoustic scene from the audio signal. The electronic device can determine whether the sound is present in the observed acoustic scene at least in part from a comparison of the representation of the observed acoustic scene with the representation of the sound. The electronic device emits a selected output responsive to determining that the sound is present in the acoustic scene.

21 Claims, 12 Drawing Sheets

(51) Int. Cl.
*G10L 25/51* (2013.01)
*G06N 20/00* (2019.01)

(56) References Cited

U.S. PATENT DOCUMENTS

| | | | | |
|---|---|---|---|---|
| 10,586,543 | B2* | 3/2020 | Binks | G10L 17/26 |
| 10,783,434 | B1* | 9/2020 | Mitchell | G06N 3/0445 |
| 2008/0240458 | A1* | 10/2008 | Goldstein | H04R 1/1083 |
| | | | | 381/72 |
| 2010/0142715 | A1* | 6/2010 | Goldstein | H04R 1/1083 |
| | | | | 707/769 |
| 2010/0271905 | A1* | 10/2010 | Khan | G10L 25/48 |
| | | | | 367/124 |
| 2014/0324739 | A1* | 10/2014 | Claussen | G06K 9/6284 |
| | | | | 706/12 |
| 2015/0032451 | A1* | 1/2015 | Gunn | G10L 15/20 |
| | | | | 704/244 |
| 2015/0380013 | A1* | 12/2015 | Nongpiur | G10L 25/51 |
| | | | | 704/231 |
| 2016/0260426 | A1* | 9/2016 | Kim | G10L 25/84 |
| 2016/0335488 | A1* | 11/2016 | Nongpiur | G10L 25/18 |
| 2017/0263266 | A1 | 9/2017 | Henrique Barbosa Postal et al. | |
| 2018/0158288 | A1* | 6/2018 | Logan | G01S 19/51 |
| 2018/0203925 | A1* | 7/2018 | Aran | G06F 16/683 |
| 2020/0159201 | A1* | 5/2020 | Deshpande | G05B 23/0254 |
| 2020/0296510 | A1* | 9/2020 | Li | G06F 3/167 |

OTHER PUBLICATIONS

Vinyals, et al., Matching Networks for One Shot Learning, Dec. 26, 2017, pp. 1-12.

Koch, et al., Siamese Neural Networks for One-Shot Image Recognition, Proceeding of the 32nd International Conference on Machine Learning, Lille, France, 2015, 8 pages, JMLR: W&CP vol. 37.

\* cited by examiner

SYSTEMS AND METHODS FOR IDENTIFYING AN ACOUSTIC SOURCE BASED ON OBSERVED SOUND

FIELD

This application and related subject matter (collectively referred to as the "disclosure") generally concern classifying acoustic scenes, and related systems and methods. More particularly, but not exclusively, this disclosure pertains to systems and methods for identifying an acoustic source based on observed sound.

BACKGROUND INFORMATION

Many home appliances, such as, for example, microwave ovens, washing machines, dishwashers, and doorbells, make sounds to alert a user that a condition of the appliance has changed. However, users may be unable to hear an audible alert emitted by a home appliance for any of a variety of reasons. For example, a user may have a hearing impairment, a user may be outside or in another room, or the appliance may emit a sound obscured by a household acoustic scene.

Other areas, e.g., public spaces (government buildings), semi-public spaces (office lobbies), and private spaces (residences or office buildings), also have acoustic scenes that can contain sounds that carry information. For example, a bell, chime, or buzzer may indicate a door has been opened or closed, or an alarm may emit a siren or other sound alerting those nearby of a danger (e.g., smoke, fire, or carbon monoxide).

SUMMARY

Some embodiments of disclosed electronic devices, processing modules, and associated methods, can learn a variety of sounds and can detect those sounds when they occur or are otherwise present in an acoustic scene. Moreover, some embodiments emit a signal or other output responsive to detecting a learned sound. Nonetheless, disclosed approaches for detecting sounds do not require audio to be stored. Rather, a compact representation of observed audio can be stored, and extracted features from training audio can be compared to extracted features representative of an observed acoustic scene. Consequently, disclosed approaches and systems can enhance user privacy compared to other approaches for recognizing sound. Further, by storing compact representations of audio, the learning and detection processing can be stored locally on an electronic device, further enhancing privacy. (Embodiments having one or more tasks executed remotely, or in a cloud or other distributed network, also are contemplated by this disclosure.)

According to a first aspect, an electronic device includes a microphone, a processor and a memory. The memory contains instructions that, when executed by the processor, cause the electronic device to receive a training audio signal corresponding to a training input to the microphone. The instructions further cause the electronic device to extract from the training audio signal a representation of a sound in the training input and to store the representation of the sound. The instructions also cause the electronic device to receive an audio signal corresponding to an acoustic scene observed by the microphone and to extract a representation of the observed acoustic scene from the audio signal. As well, the instructions cause the electronic device to determine whether the sound is present in the observed acoustic scene at least in part from a comparison of the representation of the observed acoustic scene with the representation of the sound. The instructions further cause the electronic device to emit a selected output responsive to determining that the sound is present in the acoustic scene.

The electronic device can also receive a further training audio signal corresponding to the sound and to update the stored representation of the sound in correspondence with the further training audio signal.

In some embodiments, the electronic device listens for the sound and updates the stored representation of the sound when the device determines the sound is present in an observed acoustic scene.

The training input can be a reference version of the sound and the representation of the sound can be a reference representation of the sound. The reference representation of the sound can correspond to a combination of the reference version of the sound and one or more of a frequency response representative of an environment in which the electronic device operates, a background noise, and a combination thereof. The reference representation of the sound can have reverberation or background impairments below a selected threshold level. The reference representation of the sound can include information pertaining to a direction from which the reference sound originates.

In some embodiments, the instructions further cause the electronic device, responsive to a user input, to record a training acoustic scene and to define the reference representation of the sound based at least in part on the recording of the training acoustic scene. In some embodiments, the instructions further cause the electronic device to request from a user authorization to determine the reference representation.

The reference version of the sound can have reverberation or background impairments below a selected threshold level and the reference representation of the sound can be a first reference representation of the sound. The training audio signal can be a first training audio signal and the instructions, when executed by the processor, can further cause the electronic device to receive a plurality of other training audio signals, each corresponding to a respective acoustic scene, and to define a reference representation of the sound corresponding to each of the plurality of acoustic scenes. Each respective reference representation of the sound can correspond to a combination of the reference version of the sound with the respective other audio signal corresponding to the respective acoustic scene.

The instructions can further cause the electronic device to communicate the classification to another electronic device or in a user-perceptible manner to a user, or both. The instructions can further cause the device to request from a user authorization to extract the representation of the sound in the training input The instructions can further cause the electronic device to assign the representation of the sound to a selected classification in correspondence with the training input. For example, the sound can be assigned to a selected class of device, and the output can contain information corresponding to the class of device.

The output can be a user-perceptible output or an output signal transmitted to another device. A user-perceptible output can be one or more of a visual output, a tactile output, an auditory output, an olfactory output, and a proprioceptive output.

According to another aspect, an electronic device includes a microphone, a processor, and a memory containing instructions that, when executed by the processor, cause the electronic device to learn a sound that recurs in an acoustic environment, to listen for and to detect a presence of the sound, and, responsive to a detected presence of the sound, to emit an output. For example, the sound can be emitted by another device. The other device may be an analog device, an electronic device, or a device having a combination of analog and digital components. After learning the sound, the electronic device can listen for and detect the sound in a sound field observed by the microphone. Responsive to detecting the sound in the observed sound field, the electronic device can emit the output. The output can contain information that another device emitted the sound.

The output can include a user-perceptible output. For example, the user-perceptible output can include a visual output, a tactile output, an auditory output, an olfactory output, and a proprioceptive output. The instructions, when executed by the processor, can cause the electronic device to condition one or more of the acts of learning the sound, listening for the sound, and detecting a presence of the sound on receiving an input indicative of a user's authorization to perform the one or more acts. The electronic device can be configured to store a representation of the sound, and the instructions, when executed by the processor, can further cause the electronic device to update the stored representation of the sound when the electronic device detects the sound in a sound field observed by the microphone In some embodiments, the instructions, when executed by the processor, can further cause the electronic device to prompt a user for authorization to perform one or more of the acts of learning the sound, listening for the sound, and detecting a presence of the sound; and to discern from a user-input whether the user has granted authorization to perform the one or more acts.

The instructions, when executed by the processor, can further cause the electronic device to listen for the sound combined with one or more other sounds corresponding to a selected acoustic scene. The instructions, when executed by the processor, can further cause the electronic device to discern a source of the learned sound according to a direction from which the learned sound emanates.

According to another aspect, an electronic device includes a processor, and a memory containing instructions that, when executed by the processor, cause the electronic device to receive an audio signal corresponding to an observed acoustic scene and to extract a representation of the observed acoustic scene from the audio signal. For example, the electronic device can define a reference representation of sound received by the microphone from another device. The instructions further cause the electronic device to compare the representation of the observed acoustic scene to one or more representations of sound, e.g., a reference representation of sound. Each representation of sound can correspond to a respective class of sound (e.g., a doorbell, a microwave, a smoke alarm, etc.). The instructions also cause the electronic device to determine whether one or more classes of sound is present the observed acoustic scene at least in part from a comparison of the representation of the observed acoustic scene with each of the one or more representations of sound, and to emit a selected output responsive to determining that the sound class is present in the acoustic scene. For example, from the comparison, the electronic device can determine whether sound from another device is present in the observed acoustic scene. The output emitted by the electronic device can correspond to the presence of sound from another device.

The selected output can be a user-perceptible output. The instructions, when executed by the processor, can further cause the electronic device to store the representation of the acoustic scene as a representation of sound.

In some embodiments, the other device is a first device and the reference representation is a first reference representation corresponding to the first device. The instructions, when executed by the processor, can also cause the electronic device to define a second reference representation of sound received by the microphone from a second device. The electronic device can be configured to determine whether sound from the second device is present in the observed acoustic scene from a comparison of the representation of the observed acoustic scene with the second reference representation. Responsive to determining sound from the second device is present, the electronic device can emit a selected output corresponding to the presence of sound from the second device. In some embodiments, the audio signal is a first audio signal and the acoustic scene is a first acoustic scene. In some such embodiments, the instructions, when executed by the processor, can further cause the electronic device to receive a second audio signal corresponding to a second observed acoustic scene and to extract a representation of the second observed acoustic scene from the second audio signal. The instructions can further cause the electronic device to determine whether the second acoustic scene contains a sound in the first acoustic scene based on a comparison of the representation of the second observed acoustic scene with the stored representation of the first acoustic scene.

According to still another aspect, an electronic device includes a processor, and a memory containing instructions that, when executed by the processor, cause the electronic device to receive an input corresponding to a user input and, responsive to the input, to store a reference representation of a sound. The instructions further cause the electronic device to determine a compact representation of an observed acoustic scene and to determine whether the observed acoustic scene contains the sound based in part on a comparison of the compact representation of the observed acoustic scene with the reference representation of the sound. The instructions also cause the electronic device to emit an output signal responsive to determining the observed acoustic scene contains the sound.

In some embodiments, the instructions, when executed by the processor, further cause the electronic device to receive a training input corresponding to the sound and, from the training input, to determine the reference representation of the sound.

In some embodiments, the instructions, when executed by the processor, further cause the electronic device to receive an audio signal corresponding to the observed acoustic scene, and to determine the compact representation of the observed acoustic scene from the received audio signal.

The output signal can be output over a communication connection with another electronic device.

The instructions, when executed by the processor, can further cause the electronic device to transmit, over a communication connection with another electronic device, the reference representation of the sound.

Also disclosed are associated methods, as well as tangible, non-transitory computer-readable media including computer executable instructions that, when executed, cause a computing environment to implement one or more methods disclosed herein. Digital signal processors embodied in software, firmware, or hardware and being suitable for implementing such instructions also are disclosed.

The foregoing and other features and advantages will become more apparent from the following detailed description, which proceeds with reference to the accompanying drawings.

BRIEF DESCRIPTION OF THE DRAWINGS

Referring to the drawings, wherein like numerals refer to like parts throughout the several views and this specification, aspects of presently disclosed principles are illustrated by way of example, and not by way of limitation.

DETAILED DESCRIPTION

The following describes various principles related to learning and recognizing sounds, and related systems and methods. That said, descriptions herein of specific appliance, apparatus or system configurations, and specific combinations of method acts, are but particular examples of contemplated embodiments chosen as being convenient illustrative examples of disclosed principles. One or more of the disclosed principles can be incorporated in various other embodiments to achieve any of a variety of corresponding, desired characteristics. Thus, a person of ordinary skill in the art, following a review of this disclosure, will appreciate that processing modules, electronic devices, and systems, having attributes that are different from those specific examples discussed herein can embody one or more presently disclosed principles, and can be used in applications not described herein in detail. Such alternative embodiments also fall within the scope of this disclosure.

I. OVERVIEW

Sound carries a large amount of contextual information. Recognizing commonly occurring sounds can allow electronic devices to adapt their behavior or to provide services responsive to an observed context (e.g., as determined from observed sound), increasing their relevance and value to users while requiring less assistance or input from the users.

Figure 1:
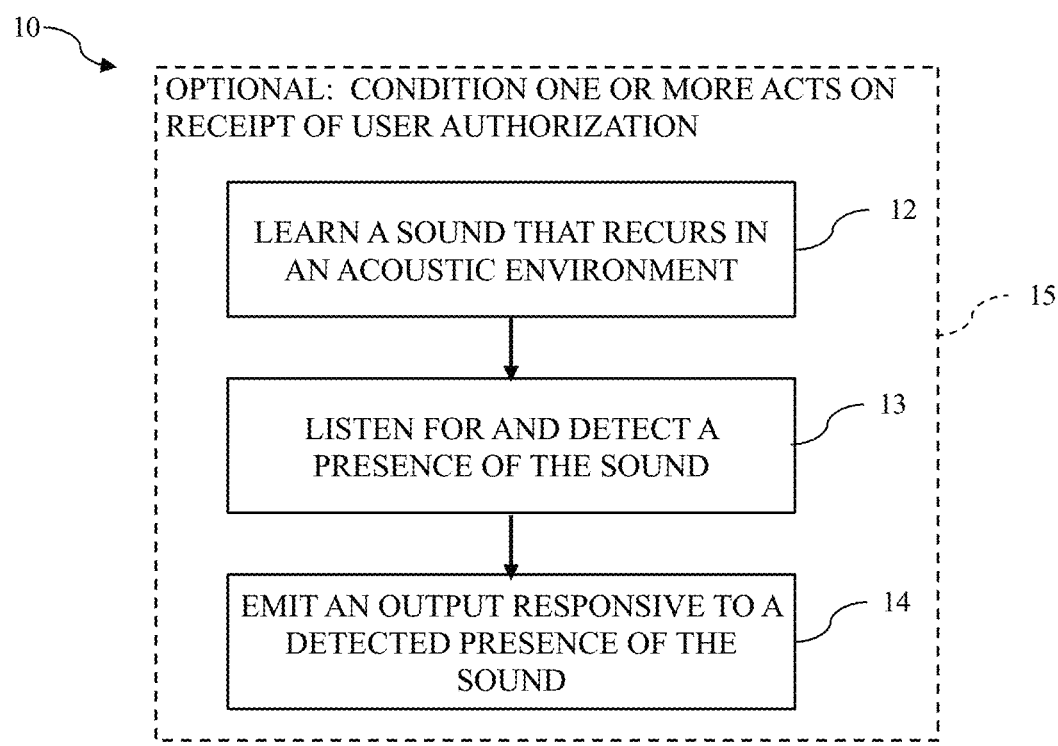
FIG. 1 illustrates a block diagram of a disclosed method for recognizing sound in an acoustic scene.

FIG. 1 illustrates a method 10 for recognizing sound that some disclosed devices, appliances, devices, and systems can perform. The method includes learning to recognize recurrent sounds, at block 12. Once one or more sounds are learned, the method includes listening for such one or more sounds at block 13, and emitting an output responsive to detecting a learned sound, at block 14. One or more of the foregoing method acts may be conditioned on first receiving a user input authorizing such act(s), as indicated by the block 15.

Figure 2:
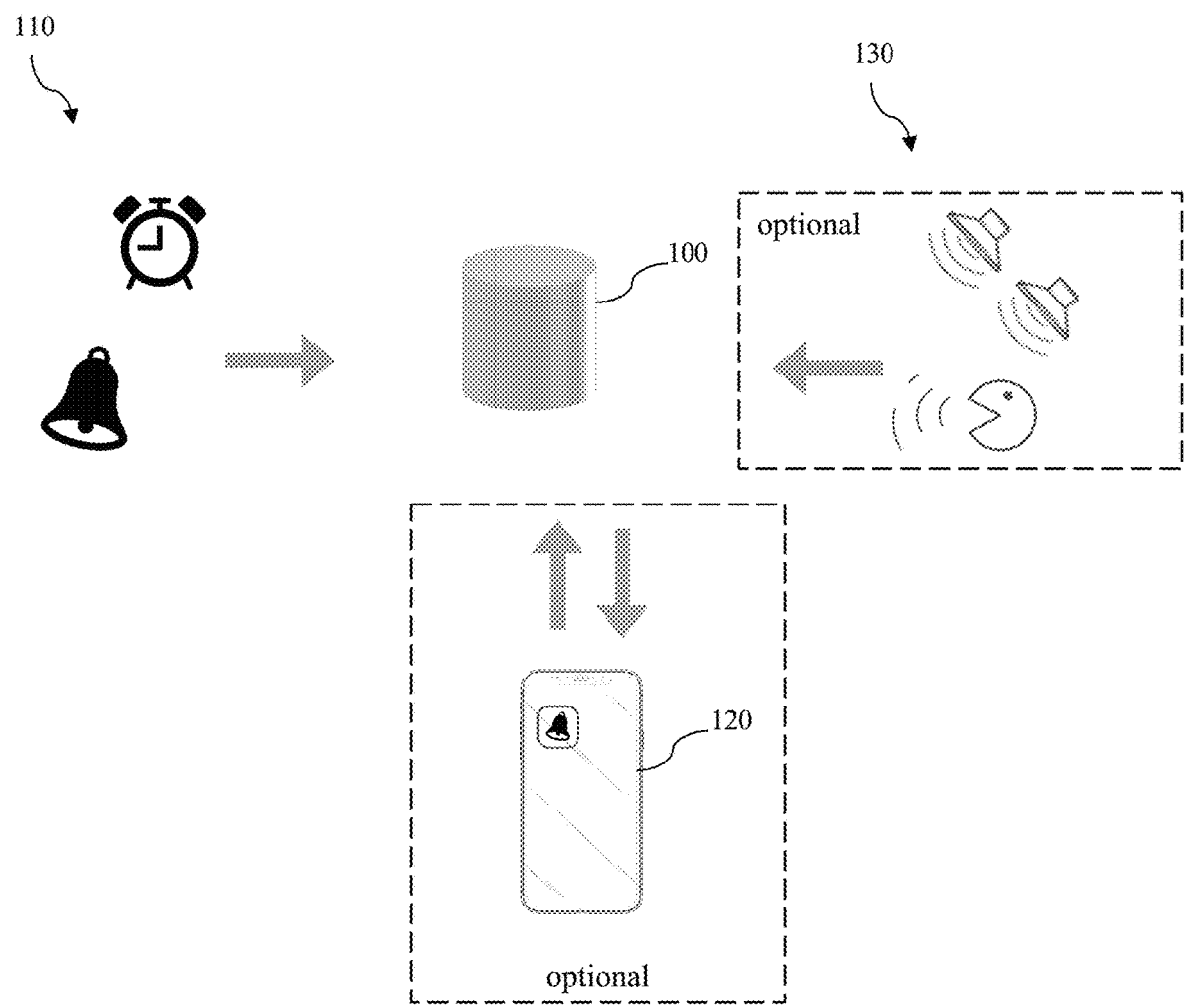
FIG. 2 illustrates an embodiment of a system configured to learn a sound.
Figure 3:
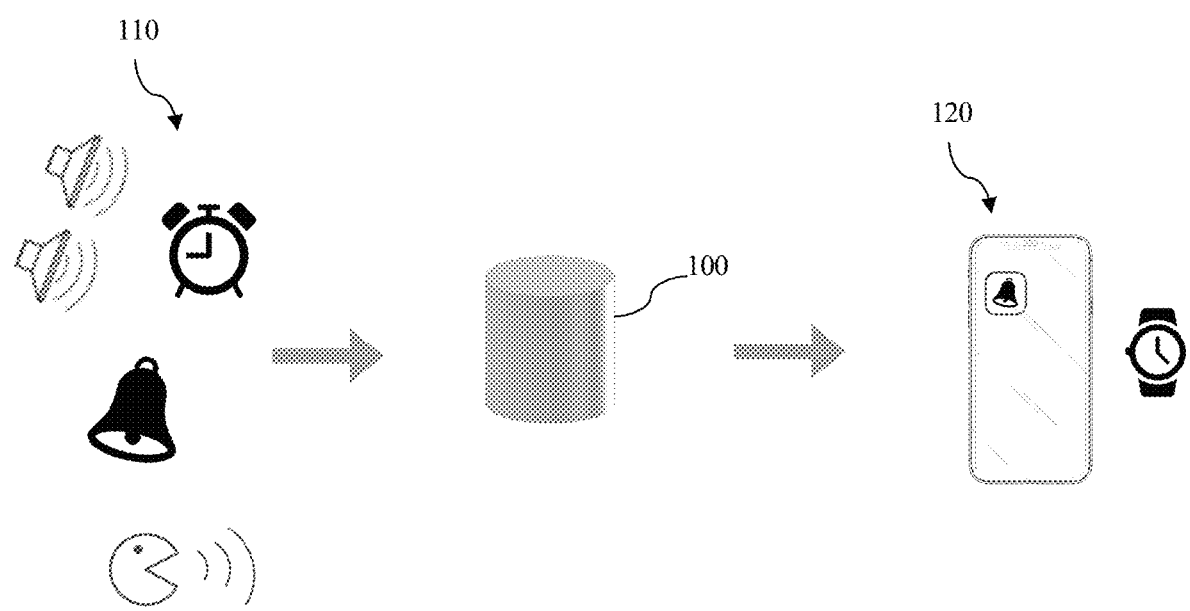
FIG. 3 illustrates an embodiment of a system configured to recognize a sound.

Referring to FIGS. 2 and 3, a device 100 equipped with a microphone can learn to recognize a particular sound in the device's environment 110, then listen for and detect when the sound is present. Moreover, the device 100 can respond to the detection, for example, by sending a notification to a user's device 120 or otherwise emitting a signal contemplated to alert a user of the sound. Further, some disclosed systems can learn and detect sounds when subjected to acoustic impairments 130, such as, for example, noise and reverberation. Some disclosed systems initiate training automatically, and some initiate training responsive to a user input. Further, some training information can be transferred from one device to another device, as indicated by the bi-directional arrows between the devices 100 and 120 in FIG. 1.

Stated differently, disclosed principles and embodiments thereof can add intelligence to a system that includes legacy (e.g., analog) appliances and other devices by learning from emitted contextual sounds.

Further details of disclosed principles are set forth below. Section II describes principles related to electronic devices, and Section III describes principles related to learning sounds. Section IV describes principles pertaining to extracting features from an audio signal and Section V describes principles concerning detecting previously learned sounds within an observed acoustic scene. Section VI describes principles pertaining to output modules, e.g., suitable for emitting a signal responsive to detecting a learned sound. Section VII describes principles related to supervised learning and Section VIII describes principles pertaining to automated learning. and Section IX describes principles concerning detection of a direction from which a sound emanates. Section X describes principles pertaining to electronic devices of the type that can embody presently disclosed principles, and A Section XI describes principles pertaining to computing environments of the type that can carry out disclosed methods or otherwise embody disclosed principles. Section XII describes other embodiments of disclosed principles.

Other, related principles also are disclosed. For example, the following describes machine-readable media containing instructions that, when executed, cause a processor of, e.g., a computing environment, to perform one or more disclosed methods. Such instructions can be embedded in software, firmware, or hardware. In addition, disclosed methods and techniques can be carried out in a variety of forms of signal processor, again, in software, firmware, or hardware.

II. ELECTRONIC DEVICES

Figure 4:
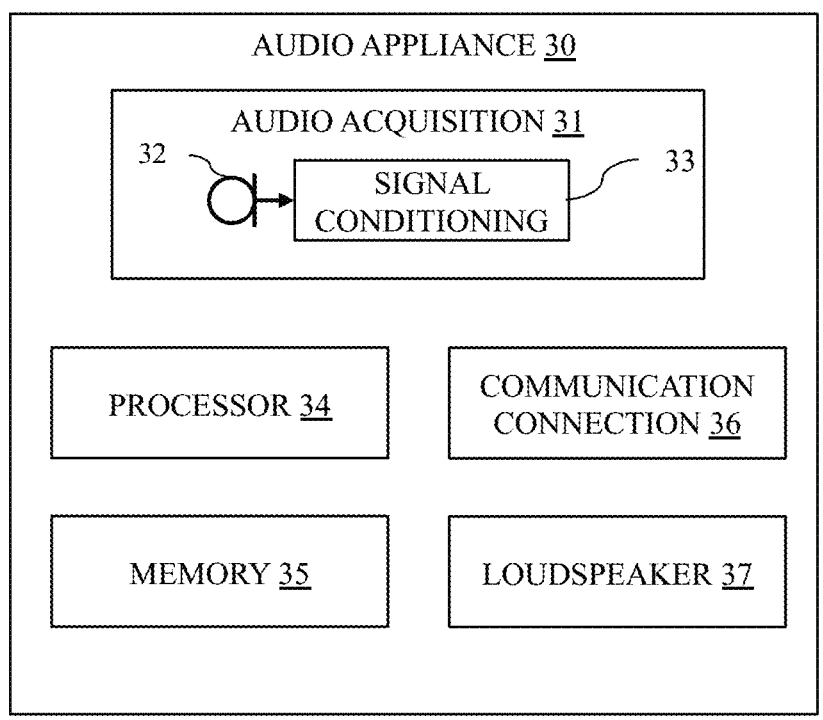
FIG. 4 schematically illustrates a block diagram of an audio appliance.

FIG. 4 shows an example of a suitable architecture for an audio appliance (e.g., electronic device 100 shown in FIGS. 2 and 3) that can carry out one or more tasks related to learning and recognizing a sound contained within a sound field (also sometimes referred to as an acoustic scene). The audio appliance 30 includes an audio acquisition module 31 and aspects of a computing environment (e.g., described more fully below in connection with FIG. 14) that can cause the appliance to respond to an acoustic scene in a defined manner. For example, the illustrated appliance 30 includes a processing unit 34 and a memory 35 that contains instructions the processing unit can execute to cause the audio appliance to, e.g., carry out one or more aspects of acquiring sound from an acoustic scene, learning to recognize the acquired sound, and detecting the sound after it has been learned.

Such instructions can, for example, cause the audio appliance 30 to capture sound with the audio acquisition module 31. The instructions can cause the audio appliance to invoke a learning task, e.g., to extract a representation of the captured sound. The learning task may be carried out locally by the appliance 30 or by a remote computing system (not shown). The captured sound could include a sound emitted by another device, such as, for example, a washing machine or a doorbell.

Referring still to FIG. 4, an audio appliance typically includes a microphone transducer to convert incident acoustic signals to corresponding electrical output. As used herein, the terms "microphone" and "microphone transducer" are used interchangeably and mean an acoustic-to-electric transducer or sensor that converts an incident acoustic signal, or sound, into a corresponding electrical signal representative of the incident acoustic signal. Typically, the electrical signal output by the microphone is an analog signal.

Although a single microphone is depicted in FIG. 4, the use of plural microphones is contemplated by this disclosure. For example, plural microphones can be used to obtain plural distinct acoustic signals emanating from a given acoustic scene, and the plural versions can be processed independently and/or combined with one or more other versions before further processing by the audio appliance 30. For example, a beamforming technique can combine outputs from plural microphones to estimate a direction from which a given sound arrived at the appliance. As well, or alternatively, the audio inputs from one or more microphones on an external device may be provided to the audio appliance and combined with, or compared to, the audio input(s) from each microphone (or a plurality of on-appliance microphones) prior to processing the audio signals. Such processing can include, for example, determining a direction from which a sound originates, as through selected beamforming techniques.

As shown in FIG. 4, the audio acquisition module 31 can include a microphone transducer 32 and a signal conditioner 33 to filter or otherwise condition the acquired audio signal. Some audio appliances have an analog microphone transducer and a pre-amplifier to condition the signal from the microphone. Output from the pre-amplifier or other conditioner can be filtered before being sampled by an analog-to-digital converter (ADC), though the output need not be filtered prior to sampling/digital conversion.

Figure 5:
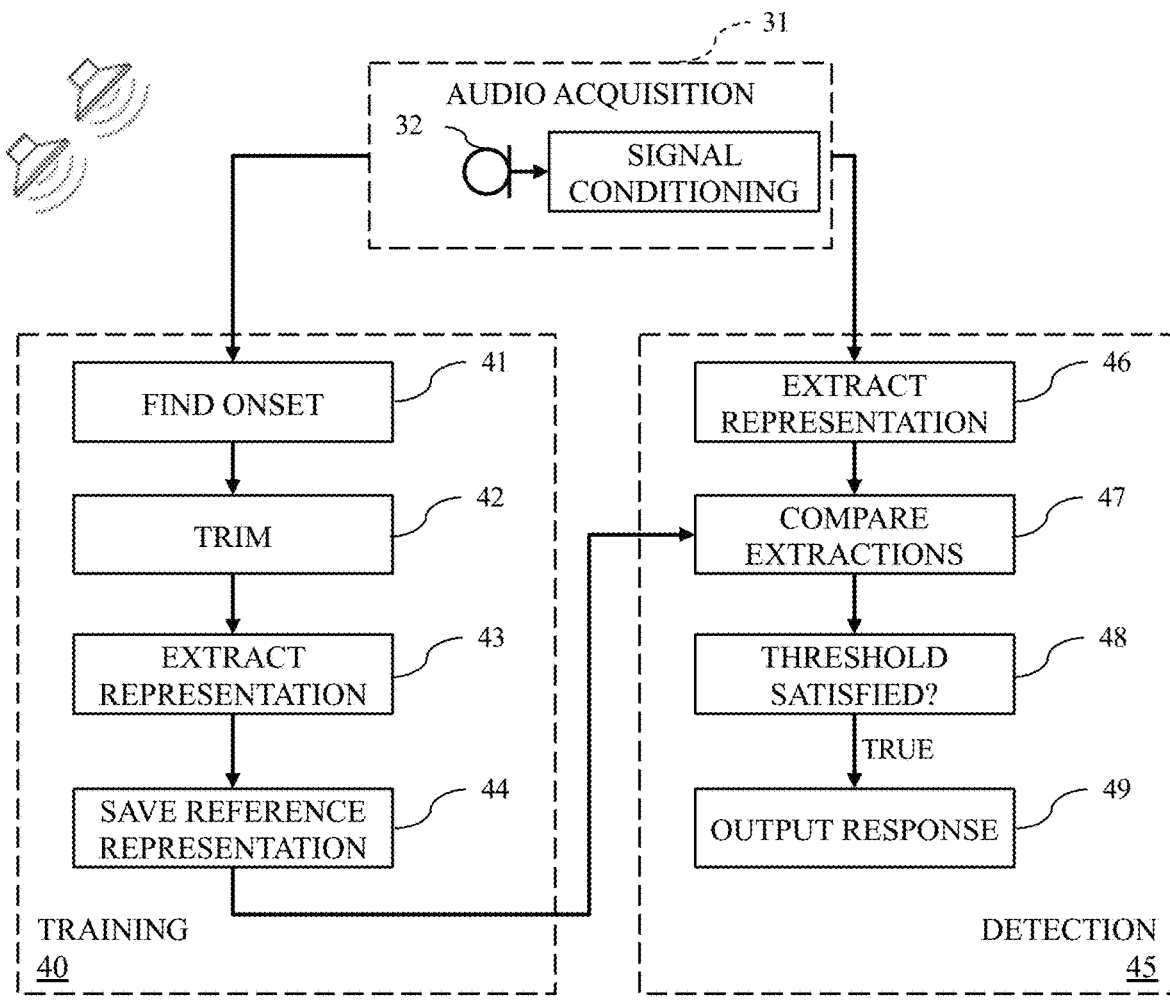
FIG. 5 schematically illustrates an embodiment of an audio appliance containing several processing modules configured to carry out a disclosed method.

The appliance 30 may include an audio processing component 34. For example, as shown in FIG. 5, the signal from the audio acquisition block 31 may be communicated to a processing module, e.g., a feature extraction module, a training module, a sound-detection module, an output module, and combinations thereof. Further each of the foregoing modules (or any of them) may be local to a given appliance, remote from the appliance, or distributed between or among the appliance and one or more other electronic devices.

Referring again to FIG. 4, the memory 35 can store other instructions that, when executed by the processor 34, cause the audio appliance 30 to perform any of a variety of tasks such as, for example, tasks related to learning sounds (e.g., block 40 in FIG. 5), detecting sounds (e.g., block 45 in FIG. 5), alerting a user to detection of a sound (e.g., block 49 in FIG. 5), and combinations thereof. As with tasks executed by a general computing environment, the aforementioned tasks can be executed locally to the device, remote from the device, or distributed between or among the appliance and one or more other electronic devices. For example, the audio appliance 30 schematically illustrated in FIG. 4 includes a communication connection 36, as to establish and to facilitate communication with another electronic device (e.g., a computing environment).

An audio appliance can take the form of a portable media device, a portable communication device, a smart speaker, or any other electronic device. Audio appliances can be suitable for use with a variety of accessory devices. An accessory device can take the form of a wearable device, such as, for example, a smart-watch, an in-ear earbud, an on-ear earphone, and an over-the-ear earphone. An accessory device can include one or more electro-acoustic transducers or acoustic acquisition modules as described above.

III. TRAINING MODULE

Referring now to FIG. 5, principles pertaining to training an electronic device with a desired sound are described. In FIG. 5, selected principles are shown as being embodied in a training module 40.

The training module 40 receives an audio signal, e.g., from the audio acquisition module 31. During the training phase, the received audio signal can be referred to as a training audio signal corresponding to a training input. The training input can be any acoustic scene containing a target sound.

At block 41, the module 40 determines (e.g., locates) an onset of the target sound in an audio stream, and at block 42, the module trims the stream of audio data to discard information outside the frames that contain the target signal. The training module 40 (e.g., with the extraction module 43) extracts a representation of the target sound from the trimmed segment of the stream. At block 44, the module 40 saves the extracted representation as a reference representation.

Although FIG. 5 shows the training module as receiving the stream of audio from the audio acquisition module 31, the audio signal can be received by the electronic device from another electronic device as in FIG. 2, e.g., over a communication connection (FIG. 1). The other electronic device can be any suitable appliance or device in communication with the electronic device, such as, for example, a portable communication device, an audio appliance, an accessory device, or a smart-home device (e.g., a thermostat having a microphone).

In such an alternative embodiment, the other electronic device (e.g., device 120) can receive sound from an acoustic environment to which that device is exposed. The received sound can be designated as a training input. Output of an acoustic transducer (e.g., a microphone transducer) can be sampled to generate an audio signal. In the case of a training input, the sampling just described generates a training audio signal. The training audio signal can be communicated from the other electronic device (e.g., device 120) to the electronic device (e.g., appliance 100) contemplated to process audio signals to recognize one or more sounds in an acoustic scene.

Alternatively, the other electronic device can process the training audio signal extract the reference representation, and the reference representation can be communicated to the appliance.

Referring again to FIG. 5, during a learning phase (also referred to as a "training phase"), a device can acquire an audio signal and a processing module (e.g., module 43) can extract features from the audio signal that are suitable for identifying a sound to be learned. The extracted components can be stored as a reference vector and the remaining components of the audio signal (e.g., noise, reverberation) can be discarded.

A learning mode can be invoked in several ways. For example, referring to FIG. 6, a user can provide input to the device (e.g., in a supervised or semi-supervised learning mode) at block 51. In a supervised learning mode, a user can prompt the device to listen for a sound to be learned. Alternatively the device can learn in a semi-supervised manner or in a fully autonomous manner (e.g., as with a method 70 according to FIG. 7). In a semi-supervised mode, a device can recognize recurrent sounds (e.g., sounds that may be relevant to a user) and verify that the sounds should be learned, e.g., by asking the user if the recurrent sounds should be learned. In an autonomous mode, the device can recognize recurrent sounds and automatically learn to recognize the recurrent sound without requiring an input, e.g., verification, from a user. For example, the extraction module 43 (FIG. 5) can extract a compact representation of the sound, and a storage module 44 can store the representation (e.g., as also indicated at block 52 in FIG. 6).

To achieve a desirable user experience, some devices can learn a new sound based on a single, or just a few, examples of the sound. Further, some devices can detect a learned sound in the presence of acoustic impairments (e.g. background noise, reverberation).

Acoustic impairments can be accounted for when establishing a suitable threshold by augmenting a recorded reference sound using a multi-condition training step when a device learns a new sound. For example, during training, the device can convolve the recorded sound with a desired number of impulse responses (e.g., to account for different levels of reverberation in an environment), and noise can be added to create an augmented set of "recorded" sounds. Each "recorded" sound in the augmented set can be processed to generate a corresponding set of reference embeddings (or representations) of the "recorded" sounds, and a unit vector can be computed for each reference embedding in the set.

Using such an approach, each reference embedding corresponds to a respective combination of impulse response and noise used to impair the basic (or original) recorded reference sound. As well, augmenting one clean example of a sound with a variety of impulse responses and noise spectra can broaden the training space without requiring a device to record the underlying reference sound multiple times (e.g., under different real conditions). Rather, such augmentation allows a device to recognize a given reference sound when present among a variety of acoustic scenes.

Impairments (impulse responses and noise) can be preset (e.g., from a factory) or can be learned during use, e.g., from observations of acoustic scenes to which the device is exposed during use. Additionally, reference sounds can be pre-recorded (e.g., during production) or the reference sounds can be learned during use (e.g., in a supervised, semi-supervised, or autonomous mode).

IV. EXTRACTION MODULE

Additional details of processing modules configured to extract one or more embeddings from an audio stream (e.g., an audio signal) are now described. As noted above briefly, the training module 40 (FIG. 5) can include or can invoke a task performed by an extraction module 43. Similarly, the detection module 45 (described more fully below) can include or can invoke a task performed by an extraction module 46. In some systems, the same processing module provides the extraction function for the training module 40 and the detection module 45. The following principles can be embodied in any of the foregoing processing modules configured to extract an embedding from an audio stream.

A neural network may be trained for a sound classification task and generate acoustic embeddings. With such a neural network, a sparse space typically separates sounds based on their individual acoustic characteristics (e.g., spectral characteristics including, for example, pitch range, timbre, etc.) For example, embeddings of most sound classes other than a target class tend toward zero when projected onto a single-class principle-components-analysis (PCA) space. Consequently, the direction of the unit vector in the PCA space corresponding to each respective class of sound differs from the directions of the other unit vectors. Accordingly, each class of sound can be discerned from other sounds.

In one embodiment, an audio signal can be transformed into a time-frequency representation, such as, for example, a log-Mel spectrogram (or other low-level set of features). The sound can be projected into a sparse space, e.g., an M-dimensonal embedding, with a neural network (e.g., a VGG-type deep neural network) trained for a sound-classification task. As noted, the sparse space can discriminate between or among different sounds based on their individual acoustic characteristics.

When training a device to learn a new sound, the extraction module can process an audio signal containing the new sound, whether the audio signal represents a reference version of the sound or an impaired version of the sound. When determining whether a given acoustic scene contains a target sound, the extraction module can process an audio signal reflecting a recording of a given acoustic scene.

V. DETECTION MODULE

In a detection mode, an electronic device, e.g., the electronic device 100 shown in FIG. 3, using an extraction module as described above, can process an audio stream based on an observed acoustic scene to extract features of the observed scene. The extracted features can be compared to the reference features defined during training to assess whether a learned sound may be present in the observed acoustic scene. For example, if differences from the reference features are less than a threshold difference, the device can determine that it has detected a known sound corresponding to the reference features.

Figure 6:
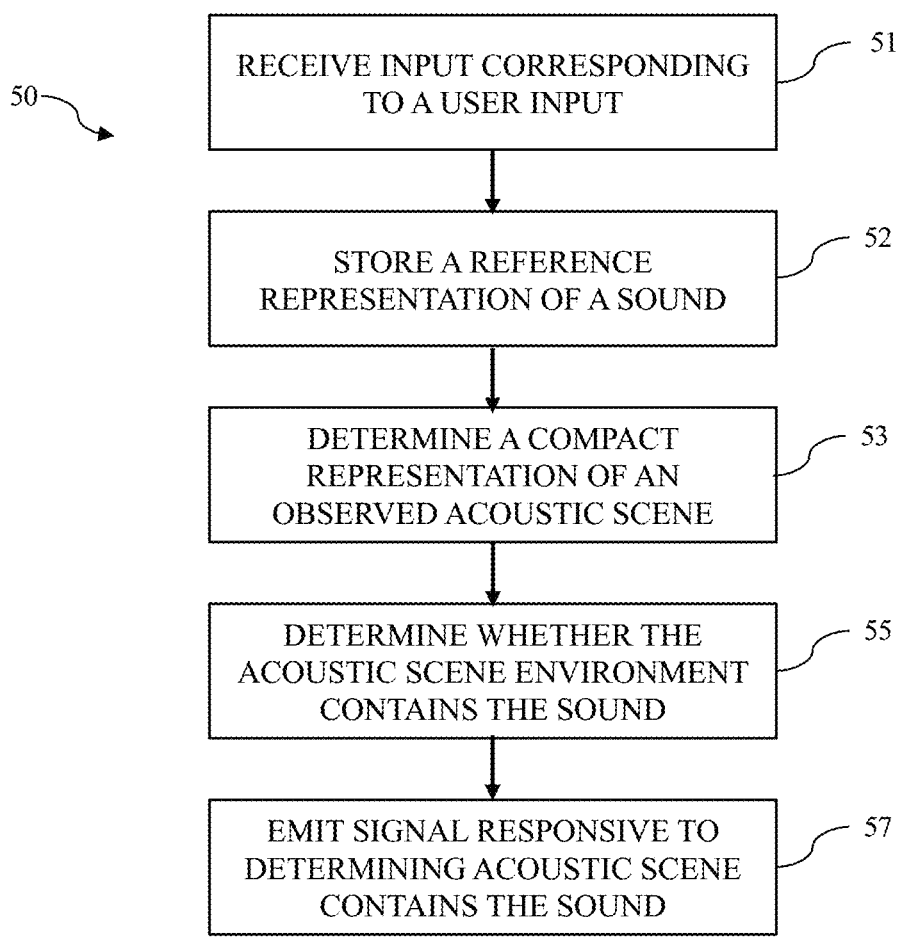
FIG. 6 illustrates a block diagram of a disclosed method for recognizing sound in an acoustic scene.
Figure 7:
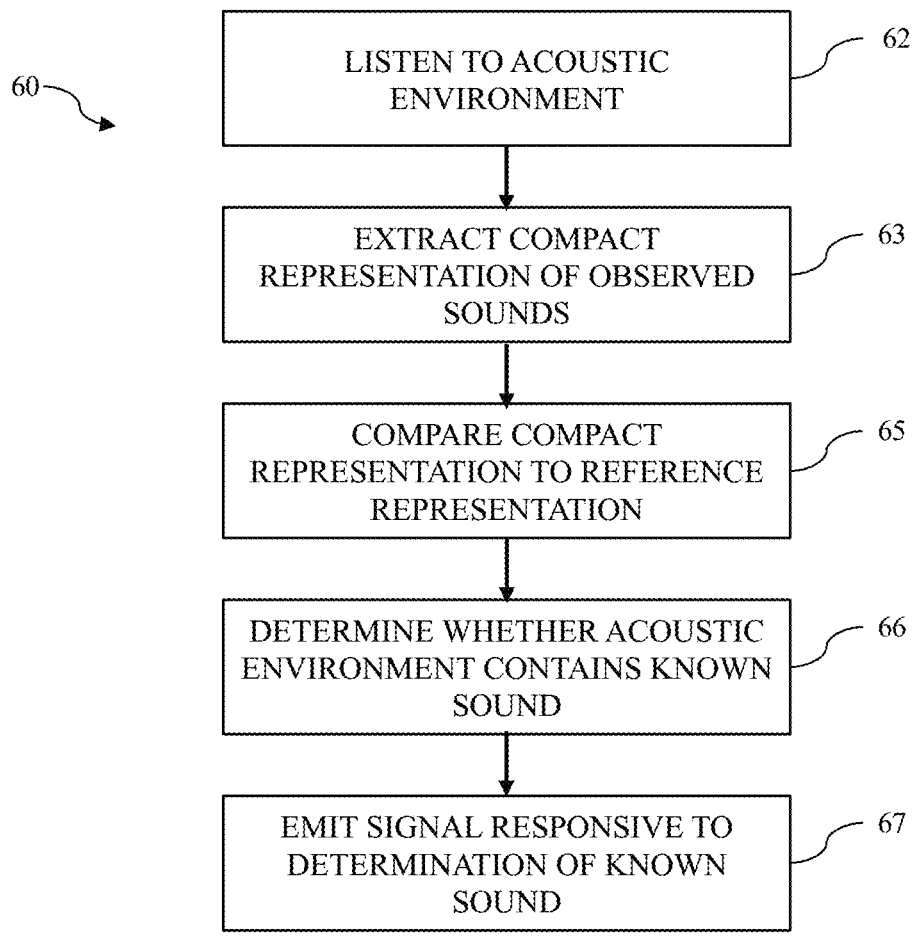
FIG. 7 illustrates a block diagram of a disclosed method for recognizing sound in an acoustic scene.

Referring to FIGS. 5, 6 and 7, tasks carried out by the detection module 45 are described. The detection module 45 can continuously transform incoming audio into acoustic embedding frames. For example, the detection module 45 can invoke an extraction task (e.g., carried out by an extraction module 46), as indicated at block 53 or 63 (FIGS. 6 and 7) to compute an observation unit vector for the incoming frame. A comparison module 47 can compare the observation unit vector with one or more reference unit vectors, as indicated at block 55 or 65 (FIGS. 6 and 7). A decision module 48 can compare a difference between the observation and the reference unit vectors to a threshold difference. If a threshold-difference parameter is satisfied, output module 49 of the device 30 can output a response, as indicated at block 57 or 67.

Figure 8:
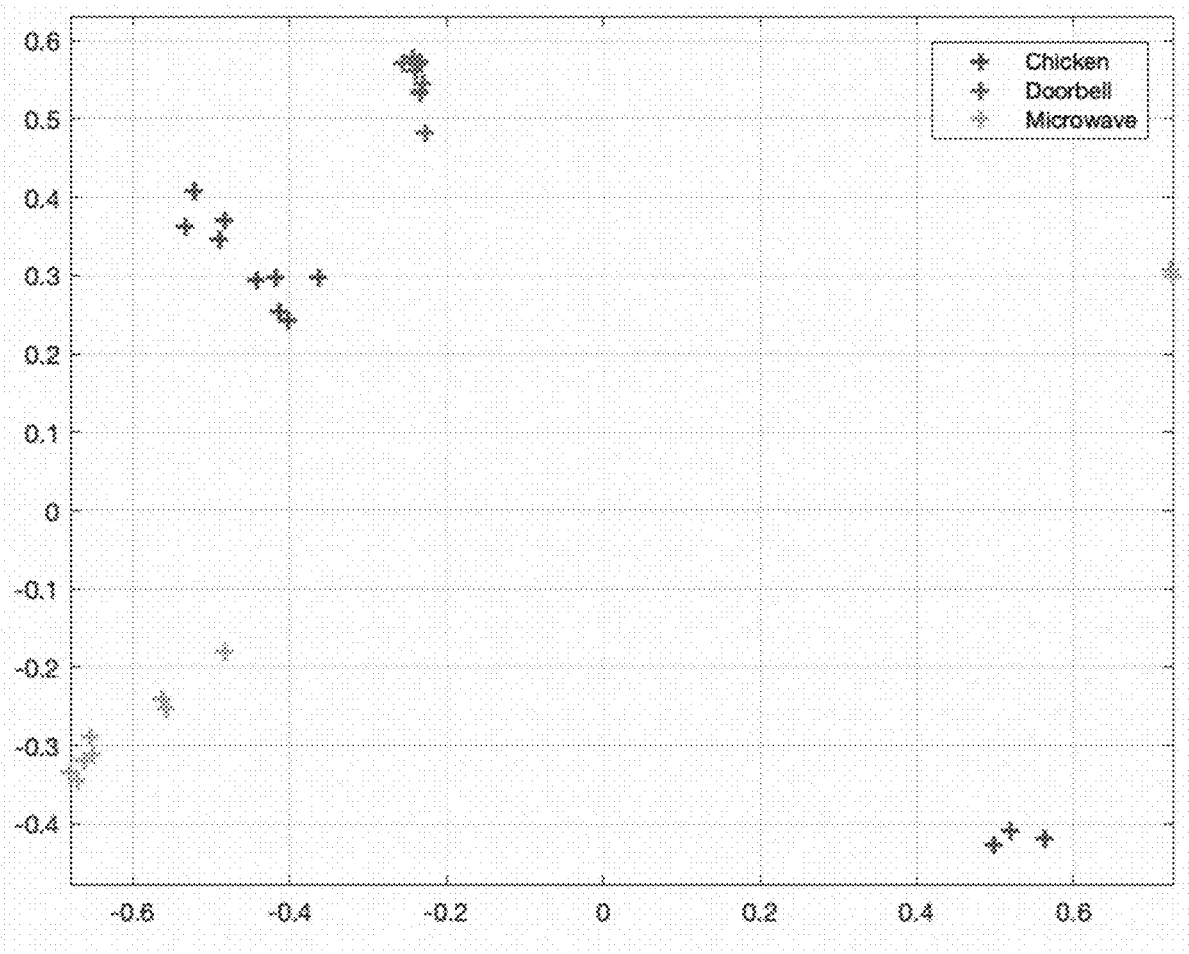
FIG. 8 illustrates a plot of first PCA elements for each of several sources of sound.

As noted, embeddings for many sounds may be sparse in a VGG-type subspace. For example, almost 90% of embeddings in a 12 k VGG subspace is a null space for most sounds. Accordingly, a 12 k subspace can be down-sampled, e.g., to a 2 k space using a max-pooling technique in time. Such down-sampling can reduce dimensionality of the embedding that otherwise could arise due to delays. And, as shown in FIG. 8, for example, the direction of the first principal component may be different for each of several reference sounds.

Figure 9:
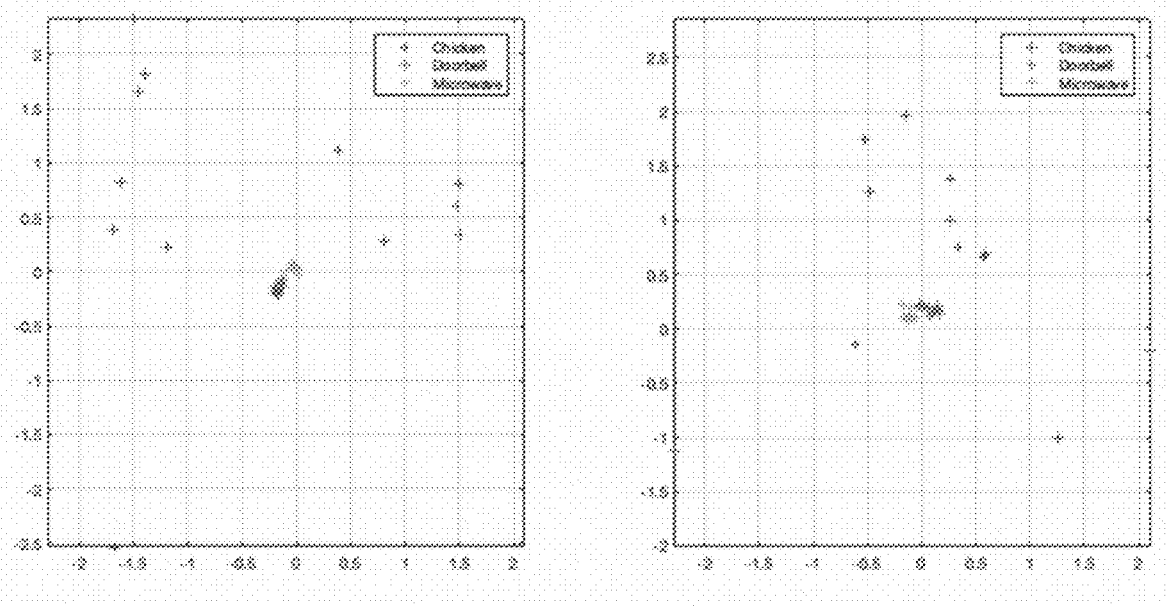
FIG. 9 illustrates plots of first and second PCA elements for unit vectors representative of each of the sources depicted in FIG. 8 projected onto a PCA space for one of the unit vectors.
Figure 10:
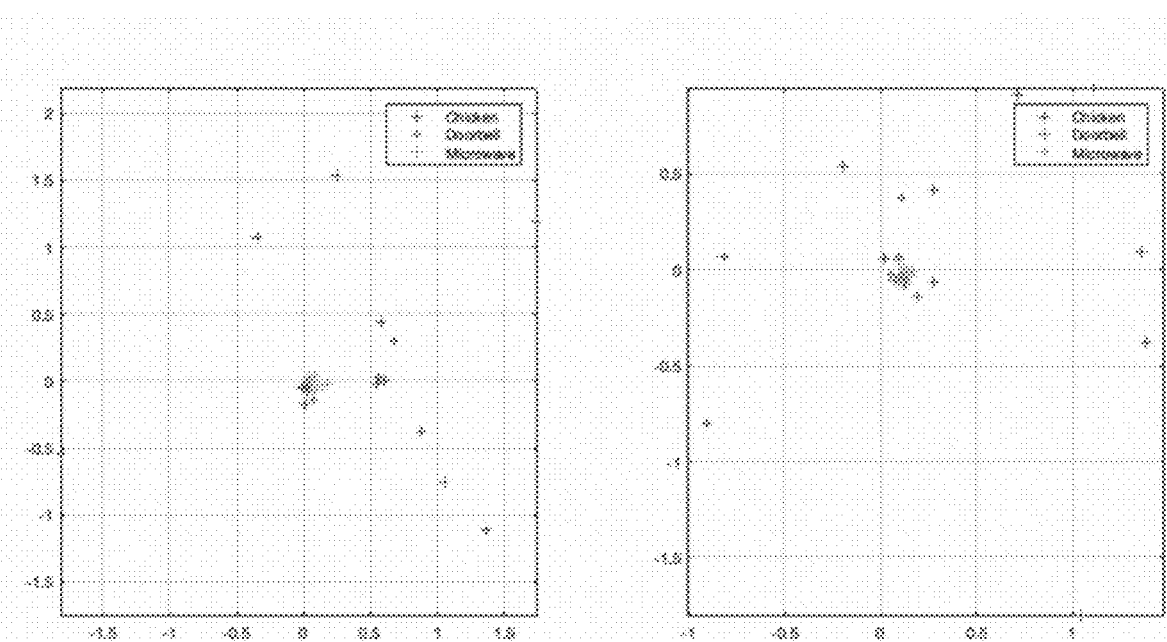
FIG. 10 illustrates plots of third and fourth PCA elements for unit vectors representative of each of the sources depicted in FIG. 8 projected onto a PCA space for one of the unit vectors.

Effects of projecting sounds onto the direction of a target sound are shown for example in FIGS. 9 and 10. To project sounds onto the direction of the unit vector for the target sound, a dot product of the unit vector aligned with the target sound x/norm(x) with the unit vector of another embedding (e.g., from an observed acoustic scene) can be computed. Normalizing the other embedding as well as the target embedding is similar or equivalent to computing the cosine distance between the unit vectors. As shown in FIGS. 9 and 10, principal components of other classes tend toward zero when projected to single-class PCA space. For example, as shown in FIGS. 9 and 10, the unit vectors for the sound labeled "chicken" are shown scattered over the first four principal components, and the unit vectors for a doorbell and a microwave are close to the origin of the "chicken" PCA space across the first four principal components.

Figure 11:
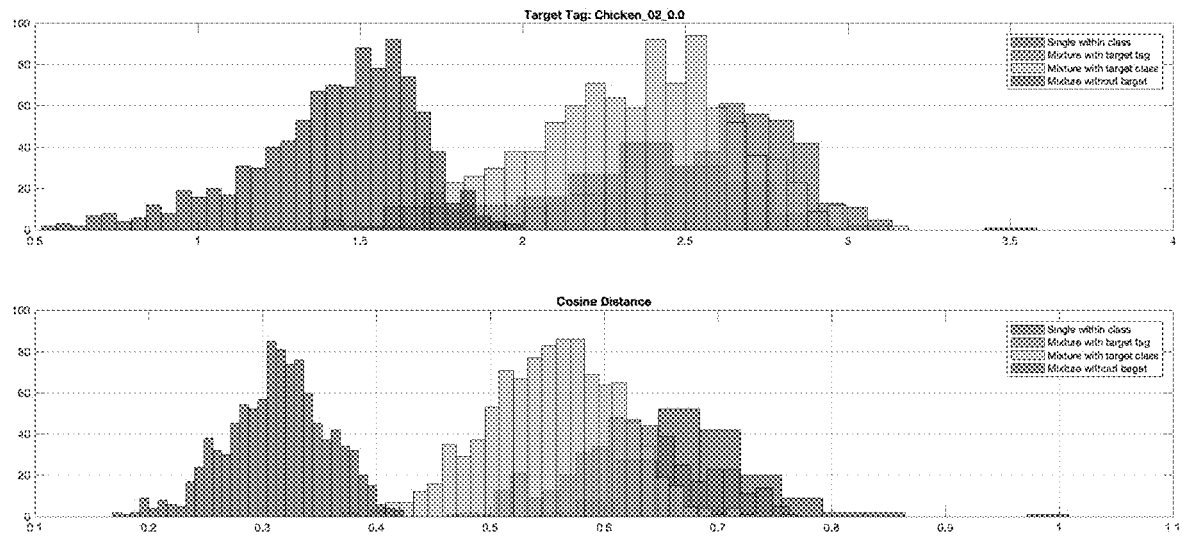
FIG. 11 illustrates a comparison of projected values and cosine distance for a first source of sound.
Figure 12:
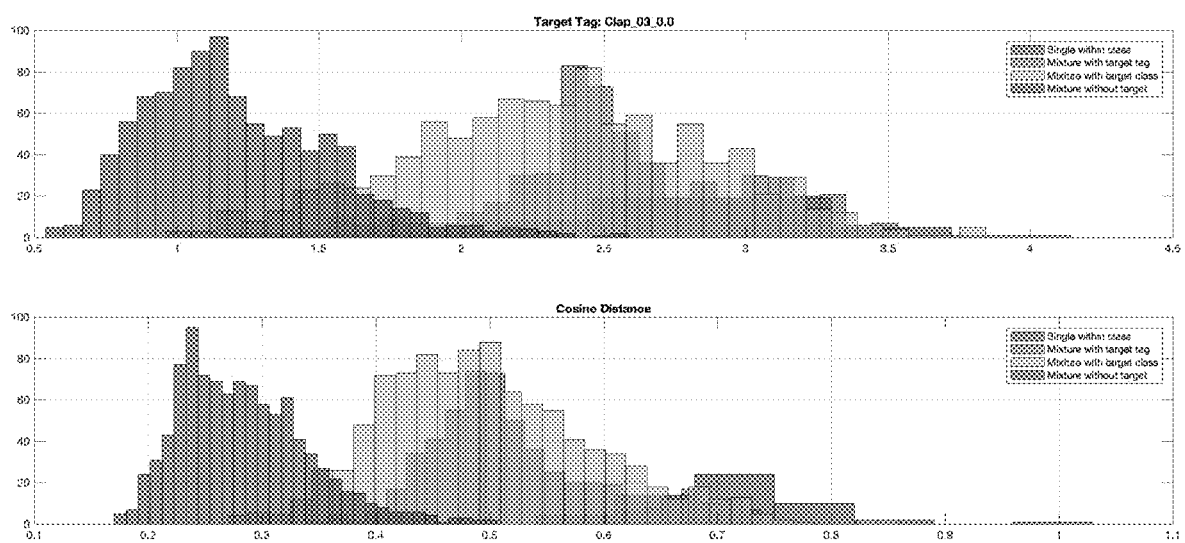
FIG. 12 illustrates a comparison of projected values and cosine distance for a second source of sound.

From the plots of the projected values and the cosine distance (FIGS. 11 through 13), it can be seen that in general cosine distance has better separation. Also the cosine distance has a normalized scale of 0 to 1 (compared to values in the 2K embeddings being nonnegative). The cosine distance separates reasonably well for a rubber chicken sound (FIG. 11) and clapping (FIG. 12).

Figure 13:
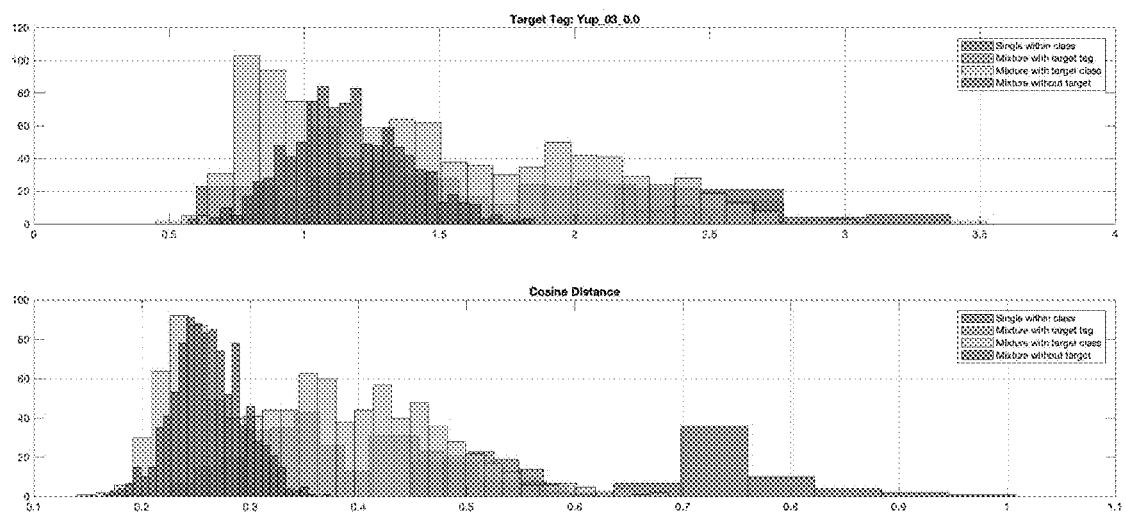
FIG. 13 illustrates a comparison of projected values and cosine distance for a third source of sound.

However, co-sine distance does not separate as well for "Yup" sounds (FIG. 13). Clean sounds separate from non-target sounds, but target words with mixtures do not separate as well from the non-target sounds. That being said, disclosed principles pertain to discerning selected classes of environmental sounds other than speech and, as FIGS. 11 and 12 show, disclosed principles can do that well for at least certain classes of sound.

VI. OUTPUT MODULE

Once an underlying sound is learned, an output module 49 (FIG. 5) of the device 30 (FIG. 4) can send a notification to another device each time the device 30 detects (or "hears") the sound in an observed acoustic scene. Thus, when a washing machine emits a tone indicating a wash cycle has finished, a device that has learned to recognize that sound can send a notification or otherwise emit an output, as to alert a user. In an example, the notification can include a message sent to another device, and in another example, the output can cause one or more room lights to flash. As well, the output emitted by the output module 49 may differ between sounds.

For example, when a doorbell rings, a disclosed audio appliance may instruct a controller to cause room lights to flash. When a washing machine emits a tone indicating a wash cycle has concluded, the audio appliance may send a notification message to a user's accessory device (e.g., a smart phone or a smart watch) indicating that the wash cycle has concluded. Additionally or alternatively, the output from the audio appliance may cause the accessory device to generate a haptic output.

Generally, a disclosed electronic device can emit an output using any suitable form of output device. In an example, the output may be an output signal emitted over a communication connection as described more fully below in connection with general purpose computing environments.

VII. SUPERVISED LEARNING MODULE

Some electronic devices invoke a supervised learning task, e.g., using a supervised learning module, responsive to a user input (or other input indicative of a received user input). In general, a user can invoke a supervised learning mode before or after a target sound is emitted. In one example, a user can provide an input to an electronic device after hearing a desired sound, indicating that the device should learn a recent sound. Responsive to the user input, the electronic device can invoke a training task as described above and process a buffered audio signal (e.g., can "look back") to extract an embedding of a recent target sound. In another example, and in response to a user input, a device can listen prospectively for a target sound and can extract an embedding of an incoming audio signal. In an embodiment, the device can enter a listening mode responsive to receiving a user input, and once in the listening mode the system can prompt the user to present the target sound.

VIII. AUTOMATED LEARNING MODULE

Some electronic devices can invoke an automated learning task or automated learning module. For example, an extraction module or task can continuously process incoming audio (e.g., captured in a circular buffer), computing incoming unit vectors for an acoustic scene. The automated learning task can estimate a histogram or other measure of sound occurrence from the incoming vectors. Once the estimated number of occurrences exceeds a threshold number of occurrences for a given embedding, the automated learning module can store the embedding as a candidate reference embedding. On a subsequent embedding within a threshold difference of the candidate reference embedding, the device can prompt a user if the corresponding sound should be learned. An affirmative user response can cause the device to promote the candidate reference embedding to a reference embedding.

In other embodiments, a user is not prompted. For example, once the estimated number of occurrences exceeds a threshold number of occurrences for a given embedding, the automated learning module can store the embedding as a new reference embedding. On a subsequent embedding within a threshold difference of the new reference embedding, the device can emit an output indicating that the newly learned sound has been detected. In this type of embodiment, a can prompt the device to delete the new reference embedding, or can reclassify the underlying sound if the device misclassified it originally.

IX. ORIENTATION MODULE

Spatial cues can improve robustness of disclosed systems. In many instances, particularly for devices that are not intended to be portable, a sound to be learned might originate from a particular direction. For example, a given smart speaker may be placed on a bookshelf and a target sound may be associated with a microwave oven or a doorbell. If the electronic device (in this instance, the smart speaker) is equipped with several microphones, beamforming techniques can estimate a direction from which sound approaches the device. Stated differently, the direction of arrival (DOA) of incoming sounds can be estimated.

In some disclosed embodiments, the DOA can be used in addition to embeddings described above to define an M+1 sparse space, and the device can learn sounds not only based on their particular acoustic characteristics but also based on the DOA.

In other embodiments, spatial cues can be used to generate an L-dimensional spatial embedding (e.g. a spatial covariance matrix) containing more information than a one-dimensional DOA. For example, a spatial embedding can include information pertaining to distance and reflections of sound from nearby objects.

X. COMPUTING ENVIRONMENTS

Figure 14:
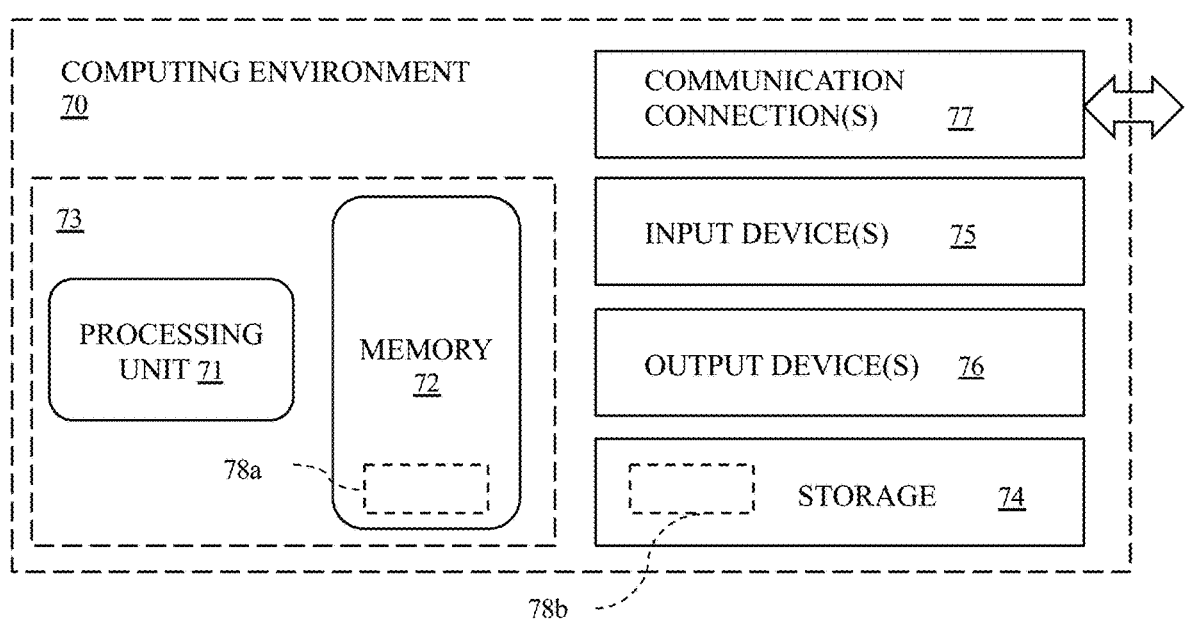
FIG. 14 illustrates a block diagram showing aspects of a computing environment.

FIG. 14 illustrates a generalized example of a suitable computing environment 70 in which described technologies relating, for example, to sound learning and detection can be implemented. The computing environment 70 is not intended to suggest any limitation as to scope of use or functionality of the technologies disclosed herein, as each technology may be implemented in diverse general-purpose or special-purpose computing environments, including within an audio appliance. For example, each disclosed technology may be implemented with other computer system configurations, including wearable and/or handheld appliances (e.g., a mobile-communications device, such as, for example, IPHONE®/IPAD®/AIRPODS®/HOME-POD™ devices, available from Apple Inc. of Cupertino, Calif.), multiprocessor systems, microprocessor-based or programmable consumer electronics, embedded platforms, network computers, minicomputers, mainframe computers, smartphones, tablet computers, data centers, audio appliances, and the like. Each disclosed technology may also be practiced in distributed computing environments where tasks are performed by remote processing devices that are linked through a communications connection or network. In a distributed computing environment, program modules may be located in both local and remote memory storage devices.

As used herein, a module, or functional component, may be a programmed general-purpose computer, or may be software instructions, hardware instructions, or both, that are executable by one or more processing units to perform the operations described herein.

The computing environment 70 includes at least one central processing unit 71 and a memory 72. In FIG. 14, this most basic configuration 73 is included within a dashed line. The central processing unit 71 executes computer-executable instructions and may be a real or a virtual processor. In a multi-processing system, or in a multi-core central processing unit, multiple processing units execute computer-executable instructions (e.g., threads) to increase processing speed and as such, multiple processors can run simultaneously, despite the processing unit 71 being represented by a single functional block.

A processing unit, or processor, can include an application specific integrated circuit (ASIC), a general-purpose microprocessor, a field-programmable gate array (FPGA), a digital signal controller, or a set of hardware logic structures (e.g., filters, arithmetic logic units, and dedicated state machines) arranged to process instructions.

The memory 72 may be volatile memory (e.g., registers, cache, RAM), non-volatile memory (e.g., ROM, EEPROM, flash memory, etc.), or some combination of the two. The memory 72 stores instructions for software 78a that can, for example, implement one or more of the technologies described herein, when executed by a processor. Disclosed technologies can be embodied in software, firmware or hardware (e.g., an ASIC).

A computing environment may have additional features. For example, the computing environment 70 includes storage 74, one or more input devices 75, one or more output devices 76, and one or more communication connections 77. An interconnection mechanism (not shown) such as a bus, a controller, or a network, can interconnect the components of the computing environment 70. Typically, operating system software (not shown) provides an operating environment for other software executing in the computing environment 70, and coordinates activities of the components of the computing environment 70.

The store 74 may be removable or non-removable and can include selected forms of machine-readable media. In general, machine-readable media includes magnetic disks, magnetic tapes or cassettes, non-volatile solid-state memory, CD-ROMs, CD-RWs, DVDs, magnetic tape, optical data storage devices, and carrier waves, or any other machine-readable medium which can be used to store information, and which can be accessed within the computing environment 70. The storage 74 can store instructions for the software 78b that can, for example, implement technologies described herein, when executed by a processor.

The store 74 can also be distributed, e.g., over a network so that software instructions are stored and executed in a distributed fashion. In other embodiments, e.g., in which the store 74, or a portion thereof, is embodied as an arrangement of hardwired logic structures, some (or all) of these operations can be performed by specific hardware components that contain the hardwired logic structures. The store 74 can further be distributed, as between or among machine-readable media and selected arrangements of hardwired logic structures. Processing operations disclosed herein can be performed by any combination of programmed data processing components and hardwired circuit, or logic, components.

The input device(s) 75 may be any one or more of the following: a touch input device, such as a keyboard, keypad, mouse, pen, touchscreen, touch pad, or trackball; a voice input device, such as one or more microphone transducers, speech-recognition technologies and processors, and combinations thereof; a scanning device; or another device, that provides input to the computing environment 70. For audio, the input device(s) 75 may include a microphone or other transducer (e.g., a sound card or similar device that accepts audio input in analog or digital form), or a computer-readable media reader that provides audio samples and/or machine-readable transcriptions thereof to the computing environment 70.

Speech-recognition technologies that serve as an input device can include any of a variety of signal conditioners and controllers, and can be implemented in software, firmware, or hardware. Further, the speech-recognition technologies can be implemented in a plurality of functional modules. The functional modules, in turn, can be implemented within a single computing environment and/or distributed between or among a plurality of networked computing environments. Each such networked computing environment can be in communication with one or more other computing environments implementing a functional module of the speech-recognition technologies by way of a communication connection.

The output device(s) 76 may be any one or more of a display, printer, loudspeaker transducer, DVD-writer, signal transmitter, or another device that provides output from the computing environment 70. An output device can include or be embodied as a communication connection 77.

The communication connection(s) 77 enable communication over or through a communication medium (e.g., a connecting network) to another computing entity. A communication connection can include a transmitter and a receiver suitable for communicating over a local area network (LAN), a wide area network (WAN) connection, or both. LAN and WAN connections can be facilitated by a wired connection or a wireless connection. If a LAN or a WAN connection is wireless, the communication connection can include one or more antennas or antenna arrays. The communication medium conveys information such as computer-executable instructions, compressed graphics information, processed signal information (including processed audio signals), or other data in a modulated data signal. Examples of communication media for so-called wired connections include fiber-optic cables and copper wires. Communication media for wireless communications can include electromagnetic radiation within one or more selected frequency bands.

Machine-readable media are any available media that can be accessed within a computing environment 70. By way of example, and not limitation, with the computing environment 70, machine-readable media include memory 72, storage 74, communication media (not shown), and combinations of any of the above. As used herein, the phrase "tangible machine-readable" (or "tangible computer-readable") media excludes transitory signals.

As explained above, some disclosed principles can be embodied in a store 74. Such a store can include tangible, non-transitory machine-readable medium (such as microelectronic memory) having stored thereon or therein instructions. The instructions can program one or more data processing components (generically referred to here as a "processor") to perform one or more processing operations described herein, including estimating, computing, calculating, measuring, detecting, adjusting, sensing, measuring, filtering, correlating, and decision making, as well as, by way of example, addition, subtraction, inversion, and comparison. In some embodiments, some or all of these operations (of a machine process) can be performed by specific electronic hardware components that contain hardwired logic (e.g., dedicated digital filter blocks). Those operations can alternatively be performed by any combination of programmed data processing components and fixed, or hard-wired, circuit components.

XI. OTHER EXEMPLARY EMBODIMENTS

As described above, one aspect of the present technology is the gathering and use of data available from various sources to improve the delivery to users of contextual information or any other information that may be of interest to them. The present disclosure contemplates that in some instances, this gathered data may include personal information data that uniquely identifies devices in a user's environment or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to issue a perceptible alert to a user in the presence of a sound, or other signal, that the user might not perceive. Accordingly, use of such personal information data enables some users to overcome a sensory impairment. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of devices that can detect or learn to identify new sounds, the present technology can be configured to allow users to select to "opt in" or "opt out" of participation in the collection of personal information data during registration for services or anytime thereafter. In another example, users can elect not to provide examples of sounds emitted by particular devices. In yet another example, users can elect to limit the types of devices to detect or learn, or entirely prohibit the detection or learning of any devices. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, machine-detectable, environmental signals other than sound can be observed and used to learn or detect an output from a legacy device, and such signals can be based on non-personal information data or a bare minimum amount of personal information, such as spectral content of mechanical vibrations (e.g., from a person knocking on a door) observed by a device associated with a user, other non-personal information available to the device (e.g., spectral content emitted by certain types of devices, e.g., doorbells, smoke detectors, commonly found in a user's listening environment), or publicly available information.

The examples described above generally concern classifying acoustic scenes and identifying acoustic sources therein, and related systems and methods. The previous description is provided to enable a person skilled in the art to make or use the disclosed principles. Embodiments other than those described above in detail are contemplated based on the principles disclosed herein, together with any attendant changes in configurations of the respective apparatus or changes in order of method acts described herein, without departing from the spirit or scope of this disclosure. Various modifications to the examples described herein will be readily apparent to those skilled in the art.

For example, the foregoing description of selected principles are grouped by section. Nonetheless, it shall be understood that each principle (or all or no principles) in a given section can be combined with one or more other principles, e.g., described in another section to achieve a desired outcome or result as described herein. Such combinations are expressly contemplated and described by this disclosure, despite that every possible combination and permutation of disclosed principles is not listed in the interest of succinctness.

Directions and other relative references (e.g., up, down, top, bottom, left, right, rearward, forward, etc.) may be used to facilitate discussion of the drawings and principles herein, but are not intended to be limiting. For example, certain terms may be used such as "up," "down,", "upper," "lower," "horizontal," "vertical," "left," "right," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" surface can become a "lower" surface simply by turning the object over. Nevertheless, it is still the same surface and the object remains the same. As used herein, "and/or" means "and" or "or", as well as "and" and "or." Moreover, all patent and non-patent literature cited herein is hereby incorporated by reference in its entirety for all purposes.

And, those of ordinary skill in the art will appreciate that the exemplary embodiments disclosed herein can be adapted to various configurations and/or uses without departing from the disclosed principles. Applying the principles disclosed herein, it is possible to provide a wide variety of approaches and systems for detecting target sounds in an acoustic scene. For example, the principles described above in connection with any particular example can be combined with the principles described in connection with another example described herein.

All structural and functional equivalents to the features and method acts of the various embodiments described throughout the disclosure that are known or later come to be known to those of ordinary skill in the art are intended to be encompassed by the principles described and the features and acts claimed herein.

Accordingly, neither the claims nor this detailed description shall be construed in a limiting sense, and following a review of this disclosure, those of ordinary skill in the art will appreciate the wide variety of methods and systems that can be devised under disclosed and claimed concepts.

Moreover, nothing disclosed herein is intended to be dedicated to the public regardless of whether such disclosure is explicitly recited in the claims. To aid the Patent Office and any readers of any patent issued on this application in interpreting the claims appended hereto or otherwise presented throughout prosecution of this or any continuing patent application, applicants wish to note that they do not intend any claimed feature to be construed under or otherwise to invoke the provisions of 35 USC 112(f), unless the phrase "means for" or "step for" is explicitly used in the particular claim.

The appended claims are not intended to be limited to the embodiments shown herein, but are to be accorded the full scope consistent with the language of the claims, wherein reference to a feature in the singular, such as by use of the article "a" or "an" is not intended to mean "one and only one" unless specifically so stated, but rather "one or more".

Thus, in view of the many possible embodiments to which the disclosed principles can be applied, we reserve the right to claim any and all combinations of features and acts described herein, including the right to claim all that comes within the scope and spirit of the foregoing description, as well as the combinations recited, literally and equivalently, in any claims presented anytime throughout prosecution of this application or any application claiming benefit of or priority from this application.

We currently claim:

1. An electronic device comprising a microphone, a processor, and a memory containing instructions that, when executed by the processor, cause the electronic device to:
   receive a first audio signal corresponding to an input to the microphone, wherein the input comprises a reference version of a sound;
   establish, based on the received first audio signal, a selected threshold level;

from the first audio signal, extract a representation of the sound in the input, wherein the representation of the sound is a reference representation of the sound, and the reference representation of the sound comprises reverberation or background impairments below the selected threshold level;

store the representation of the sound;

receive a second audio signal corresponding to an acoustic scene observed by the microphone;

extract a representation of the observed acoustic scene from the second audio signal;

determine whether the sound is present in the observed acoustic scene at least in part from a comparison of the representation of the observed acoustic scene with the representation of the sound;

emit a selected output responsive to determining that the sound is present in the acoustic scene; and update the stored representation of the sound when the processor determines the sound is present in an observed acoustic scene.

2. The electronic device according to claim 1, wherein the instructions, when executed by the processor, further cause the electronic device to receive a further audio signal corresponding to the sound and to update the stored representation of the sound in correspondence with the further audio signal.

3. The electronic device according to claim 1, wherein the reference representation of the sound corresponds to a combination of the reference version of the sound and one or more of a frequency response representative of an environment in which the electronic device operates, a background noise, or a combination thereof.

4. The electronic device according to claim 1, wherein the reference representation of the sound comprises information pertaining to a direction from which the sound originates.

5. The electronic device according to claim 1, wherein the instructions, when executed by the processor, further cause the electronic device to receive a plurality of other audio signals, each corresponding to a respective acoustic scene, and to define a second reference representation of the sound corresponding to each respective acoustic scene, and wherein each respective reference representation of the sound corresponds to a combination of the reference version of the sound with the respective other audio signal corresponding to the respective acoustic scene.

6. The electronic device according to claim 5, wherein the instructions further cause the electronic device to communicate a classification of the sound to another electronic device or in a user-perceptible manner to a user, or both.

7. The electronic device according to claim 1, wherein the instructions further cause the electronic device to request from a user authorization to extract the representation of the sound in the input.

8. The electronic device according to claim 1, wherein the instructions further cause the electronic device to assign the representation of the sound to a selected class of device, and wherein the selected output contains information corresponding to the selected class of device.

9. The electronic device according to claim 1, wherein the selected output comprises one or more of a visual output, a tactile output, an auditory output, an olfactory output, and a proprioceptive output a user-perceptible output or an output signal transmitted to another device.

10. An integrated circuit comprising circuitry configured to:

learn a sound emitted by another device when the sound recurs in an acoustic scene observed by a microphone;

establish, based on the learned sound, a selected threshold level;

after learning the sound, listen for and detect a presence of the sound in a sound field;

cause a memory to store a reference representation of the sound, wherein the reference representation includes an acoustic impairment below the selected threshold level;

responsive to a detected presence of the sound in the sound, emit an output; and update the stored reference representation of the sound when the sound is detected in the sound field.

11. The integrated circuit according to claim 10, wherein the output comprises a user-perceptible visual output, tactile output, auditory output, olfactory output, or proprioceptive output.

12. The integrated circuit according to claim 10, wherein the circuitry is further configured to condition one or more acts including one or more of learning the sound, listening for the sound, and detecting the presence of the sound on receiving an input indicative of a user's authorization to perform the one or more acts.

13. The integrated circuit according to claim 10, wherein the other device is an analog device and the output contains information that indicates the analog device emitted the sound.

14. The integrated circuit according to claim 10, wherein the circuitry is further configured to listen for the sound combined with one or more other sounds corresponding to a selected acoustic scene.

15. The integrated circuit according to claim 10, wherein the circuitry is further configured to discern a source of the learned sound according to a direction from which the learned sound emanates.

16. A method, comprising:

defining a reference representation of sound captured by a microphone of another device;

establishing, based on the sound, a selected threshold level, wherein the reference representation of the sound comprises at least one of a reverberation or an acoustic impairment below the selected threshold level;

extracting a representation of an acoustic scene;

comparing the representation of the acoustic scene with the reference representation of sound from the other device;

from the comparing, determining whether sound from the other device is present in the acoustic scene; and responsive to determining sound from the other device is present, emitting a selected output.

17. The method according to claim 16, wherein the selected output is a user-perceptible output.

18. The method according to claim 16, wherein the other device is a first device, the reference representation is a first reference representation corresponding to the first device, and the method further comprises:

defining a second reference representation of a second sound received from a second device;

determining whether the second sound from the second device is present in the observed acoustic scene from a comparison of the representation of the observed acoustic scene with the second reference representation; and responsive to determining the second sound from the second device is present, emitting a second selected output corresponding to a presence of the second sound from the second device.

19. The method according to claim 16 wherein the acoustic scene is a first acoustic scene, and the method further comprises:
  extracting a representation of a second acoustic scene; and
  determining whether the second acoustic scene contains a sound in the first acoustic scene from a comparison of the representation of the second acoustic scene with the representation of the first acoustic scene.

20. The method according to claim 16, further comprising conditioning a definition of the reference representation of sound on receiving a user input.

21. The method according to claim 16, wherein the selected output is output over a communication connection with the other device.

* * * * *